United States Patent
West et al.

(10) Patent No.: US 9,803,677 B2
(45) Date of Patent: Oct. 31, 2017

(54) METHOD AND APPARATUS FOR LIMITING TRAVEL AND CONSTRAINING LINER MOVEMENT OF A NUT ELEMENT WITHIN A CHANNEL

(71) Applicant: SolarCity Corporation, San Mateo, CA (US)

(72) Inventors: Jack Raymond West, San Rafael, CA (US); Tyrus Hawkes Hudson, San Rafael, CA (US)

(73) Assignee: SolarCity Corporation, San Mateo, CA (US)

( * ) Notice: Subject to any disclaimer, the term of this patent is extended or adjusted under 35 U.S.C. 154(b) by 328 days.

(21) Appl. No.: 14/599,931

(22) Filed: Jan. 19, 2015

(65) Prior Publication Data

US 2015/0204372 A1 Jul. 23, 2015

Related U.S. Application Data

(60) Provisional application No. 61/930,430, filed on Jan. 22, 2014.

(51) Int. Cl.
| | | |
|---|---|---|
| *F16B 37/00* | (2006.01) | |
| *F16B 37/04* | (2006.01) | |
| *F16B 7/18* | (2006.01) | |
| *F24J 2/52* | (2006.01) | |

(52) U.S. Cl.
CPC ............ *F16B 37/046* (2013.01); *F16B 7/187* (2013.01); *F24J 2/5245* (2013.01); *F24J 2/5264* (2013.01); *Y02E 10/47* (2013.01); *Y10T 29/49948* (2015.01)

(58) Field of Classification Search
CPC ....... F16B 37/046; F16B 7/187; F24J 2/5245; F24J 2/564
USPC .................. 411/85, 104; 248/222.41, 222.21; 29/809
See application file for complete search history.

(56) References Cited

U.S. PATENT DOCUMENTS

| | | | | |
|---|---|---|---|---|
| 2,413,669 A | | 12/1946 | Whitcombe | |
| 3,233,501 A | * | 2/1966 | Van Buren, Jr. .......... | F16B 7/18 411/104 |
| 3,256,671 A | * | 6/1966 | Handley .................... | E04C 3/06 411/85 |
| 3,680,620 A | * | 8/1972 | Gotschel ................... | E06B 1/18 403/231 |
| 4,033,663 A | * | 7/1977 | McCardell ................ | H01R 4/34 248/27.3 |
| 4,315,393 A | * | 2/1982 | Schack .................. | E04B 1/4128 411/427 |
| 5,628,597 A | * | 5/1997 | Chudoba ................ | F16B 37/046 411/85 |

(Continued)

OTHER PUBLICATIONS

RoofTrac, "The Original Top-Down PV Mounting System", pp. 1-2 (retrieved from www.RoofTrac.com on Jan. 16, 2015).

(Continued)

*Primary Examiner* — Gary Estremsky
(74) *Attorney, Agent, or Firm* — Kilpatrick Townsend & Stockton LLP

(57) ABSTRACT

A system to prevent a sliding nut in a channel in a bar from escaping from the channel, and to prevent the nut from entering a no-go-zone at the end of the channel. The system is adjustable to position the nut at a desirable location along the length of the channels to mount coupling devices onto the bar.

12 Claims, 11 Drawing Sheets

(56) References Cited

U.S. PATENT DOCUMENTS

| | | | | |
|---|---|---|---|---|
| 5,779,412 | A | * | 7/1998 | Nagai ............... E04B 2/766 411/104 |
| 5,833,417 | A | * | 11/1998 | Sargent ............ F16B 37/046 248/58 |
| 6,360,491 | B1 | | 3/2002 | Ullman |
| 6,712,543 | B1 | * | 3/2004 | Schmalzhofer ...... F16B 7/187 403/187 |
| 7,905,694 | B2 | * | 3/2011 | van Walraven ...... F16B 21/18 411/85 |
| 2002/0098035 | A1 | * | 7/2002 | Karlinger ........... F16B 7/187 403/187 |
| 2003/0185643 | A1 | * | 10/2003 | Thompson .......... F16B 37/046 411/85 |
| 2013/0177366 | A1 | | 7/2013 | Whipple et al. |
| 2014/0137489 | A1 | * | 5/2014 | Habdank ............ F24J 2/5207 52/173.3 |

OTHER PUBLICATIONS

Unistrut Solar Installation Products, "Installation demonstration using Unistrut Solar Clamps", Atkore International 2011, pp. 1-5.
International Search Report, dated May 4, 2015, for corresponding international patent application PCT/US2015/011928, 3 pages.
Written Opinion, dated May 4, 2015, for corresponding international patent application PCT/US2015/011928, 9 pages.

\* cited by examiner

METHOD AND APPARATUS FOR LIMITING TRAVEL AND CONSTRAINING LINER MOVEMENT OF A NUT ELEMENT WITHIN A CHANNEL

RELATED APPLICATION

The present application claims priority to U.S. Provisional Patent Application 61/930,430, of same title, filed Jan. 22, 2014.

TECHNICAL FIELD

The present invention relates to solar panel mounting systems.

BACKGROUND

Many systems exist to mount photovoltaic (PV) modules on roof tops and similar structures or substrates. Current systems typically comprise roof attachment devices such as a strut or bar channel product that is assembled with a coupling device that mounts and secures the PV module. The coupling device of these systems is connected to the strut by way of a bolt or nut. Unfortunately, previous attempts to develop a roof attachment device like a strut have suffered from a number of drawbacks. For example, common struts are left exposed or unsecured and nuts are forced to be contained in a predetermined designated position. Furthermore, common struts are costly, do not optimize material usage, typically manufactured from brittle materials that have higher failure rates than resilient materials, require expensive manufacturing methods, and do not properly account for misalignment of components during installation.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, apparatus, tools, and methods which are meant to be exemplary and illustrative, not limiting in scope. In various embodiments, one or more of the above-described problems have been reduced or eliminated, while other embodiments are directed to other advantages or improvements.

One embodiment of the present invention is an end cap that includes nut shaped slots that allow a sliding nut to be inserted or removed. The end cap further includes a flexible finger that protrudes into each channel of the bar at a desirable distance such that the sliding nut may not reach the end of the channel. For example, the flexible finger may be designed to prevent a sliding nut in the channel from escaping the channel, and to prevent the nut from entering a "no-go-zone" at the end of the channel (for example, 35 mm). Advantageously, the present system will ensure that the position of the sliding nut is constrained while still allowing the sliding nut to be adjustable. This advantageously enables the installer to choose a desirable location along the length of the channels to mount a coupling device on a bar.

The present invention also includes a bar having one or more channels. The bar is secured by an end cap that is attached to one or both ends of the bar. One or more of the channels of the bar and the end cap are sized to receive a sliding nut. For example, liner channels designed to accept nuts can be used. Advantageously, the channels of the bar will allow the installer to choose a desirable location for mounting a coupling device on the bar. Thus, the position of the sliding nut may be adjustable along the length of the channels within the bar. The end cap may be secured to one or both ends of the bar with the sliding nut inserted into a slot of holes of the end cap, thereby engaging the channels of the bar.

In addition to the exemplary aspects and embodiments described above, further aspects and embodiments will become apparent by reference to the figures and by study of the following detailed descriptions.

BRIEF DESCRIPTION OF THE DRAWINGS

Demonstrative embodiments are illustrated in referenced figures and drawings. It is intended that the embodiments and figures disclosed herein are to be considered illustrative rather than restrictive.

DETAILED DESCRIPTION OF ONE OR MORE EMBODIMENTS OF THE INVENTION

Figure 1:
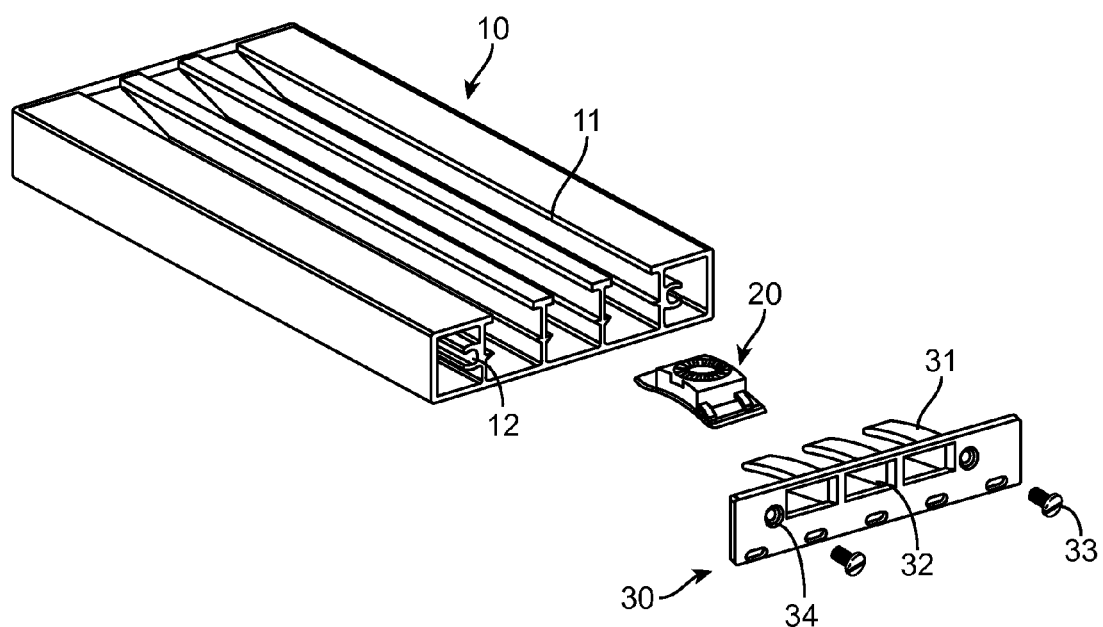
FIG. 1 is an isometric view of a bar comprising three channels, a sliding nut, and an end cap.

Terms. With reference to the figures and description herein but without limitation:

Attach or attachment refers to one or more items, mechanisms, objects, things, structures or the like which are joined, fastened, secured, affixed or connected to another item, or the like in a permanent, removable, secured or non-permanent manner.

Connect or connecting refers to loosely, slidably, or rigidly bringing together or into contact with or joining or fastening to form a link or association between two or more items, mechanisms, objects, things, structures or the like.

Connector refers to an object, item, mechanism, apparatus, combination, feature, link or the like that loosely, slidable, or rigidly links, interlocks, joins, unites or fastens two or more things together. A connector may also include a device, an object, item, mechanism, apparatus, combination, feature, link or the like for keeping two parts of an electric or electronic circuit in contact.

Coupling refers to an object, item, mechanism, apparatus, combination, feature, link or the like that loosely, slidably, or rigidly joins, links, mates, interlocks, or connects two things together.

Enable refers to facilitating or making possible, able, feasible, practical, operational, or easy; or to cause to operate.

Engage refers to interlocking or meshing or more items, mechanisms, objects, things, structures or the like.

Insertable refers to an object, item, mechanism, apparatus, combination, feature, link or the like which is capable of being put in, entered into, set within, introduced, inset, inserted, placed, fit or thrust into another an object, item, mechanism, apparatus, combination, feature, link or the like.

Length refers to a measurement or extent of an object, item, mechanism, apparatus, combination, feature, link or the like from end to end, usually along the greater or longer of the two or three dimensions of the body; in distinction from breadth or width.

Located refers to where an object or a series of objects is physically situated with respect to one or more other objects.

Photovoltaic module (sometimes referred to as a PV module, solar panel, solar module, or photovoltaic panel) refers to a packaged, interconnected assembly of solar cells, also known as photovoltaic cells, frequently, but not always, laminated with glass and other materials and sometimes surrounded by a frame. A plurality of PV modules are commonly used to form a larger photovoltaic system referred to as a PV array (see below), to provide electricity for commercial, industrial and residential applications.

Pivotally refers to or relates to an object, item, mechanism, apparatus, combination, feature, link or the like serving as a pivot or the central point, pin, shaft or contact on which another object, item, mechanism, apparatus, combination, feature, link or the like turns, swings, rotates or oscillates.

PV module refers to a photovoltaic module (sometimes referred to as a solar panel or photovoltaic panel) is a packaged interconnected assembly of solar cells, also known as photovoltaic cells, frequently, but not always, laminated with glass and other materials and sometimes surrounded by a frame. A plurality of PV modules are commonly used to form a larger photovoltaic system referred to as a PV array (see below), to provide electricity for commercial, industrial and residential applications.

PV array refers to a plurality of photovoltaic modules connected together often in a pattern of rows and columns with module sides placed close to or touching other modules.

Removable refers to one or more items, mechanisms, objects, things, structures or the like which are capable of being removed, detached, dismounted from or taken-away from another item or the like, or combination.

Support structure refers to a structure, such as a roof, table or the ground which may provide a base for securing PV modules to form a PV array.

Threaded refers to one or more items, mechanisms, objects, things, structures or the like which have, embody or include an essentially helical or spiral ridge or rib, as on a screw, nut, or bolt.

Various locations refers to places, positions or sites that are different from one another, more than one, individual or separate.

Width refers to the state, quality, or fact of being wide or a measurement or extent of something from side to side; in distinction from breadth or length.

FIG. 1 is an isometric view of a strut or a channel product like bar 10. FIG. 1 further discloses sliding nut 20, and end cap 30. Bar 10 is used as a base plate or attachment device for connecting a leveling foot or some coupling device to a substrate or surface. Preferably, bar 10 comprises a plurality of aligned linear channels 11 for receiving sliding nut 20. Preferably, channels 11 are the same width as sliding nut 20. Alternatively, channels 11 may be manufactured with different size widths for accepting larger or small sized sliding nuts. Bar 10 further comprises an aperture 12 for receiving screws 33.

End cap 30 is an accessory or feature device that is attached to either ends of bar 10. End cap 30 is used to limit travel and constrain linear movement of sliding nut 20 within channel 11. End cap 30 comprises of flexible fingers 31 that protrude into each channel 11 of bar 10. Flexible finger 31 is used to protrude into channel 11 to prevent sliding nut 20 from entering a "no-go-zone" within channel 11 (for example, 35 mm). Preferably, flexible fingers 31 is made of flexible material, designed to flex out of the way of sliding nut 20 when installed, and return to its nominal position. Examples of flexible materials include plastic, acrylic, rubber, or the like. Alternatively, flexible fingers 31 may be a spring coil, plastic guard, or another embodiment that functionally operates to prevent sliding nut from entering the "no-go-zone" of the bar.

End cap 30 further comprises slots 32. Slots 32 are designed to receive sliding nut 20. Preferably, slots 32 are similar in shape and width to channels 11 and sliding nut 20 to allow sliding nut 20 to be installed or removed. Alternatively, slots 32 may be larger in width for receiving larger sized sliding nuts. End cap 30 further comprises holes 34 for receiving screws 33.

Figure 2:
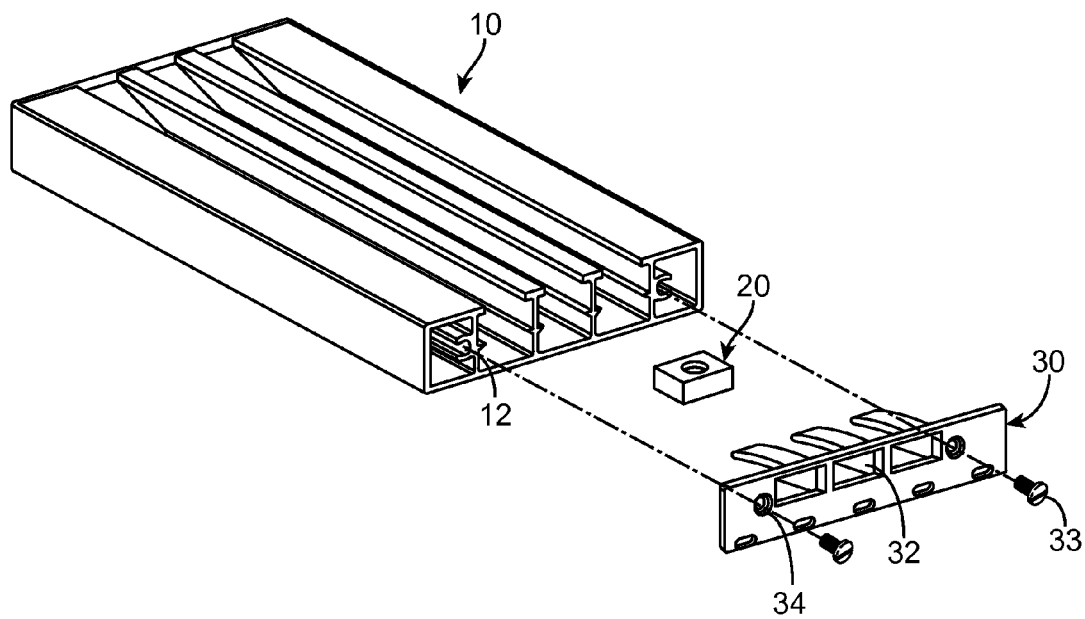
FIG. 2 is an isometric view of the installation process of an end cap and sliding nut onto a bar.
Figure 3:
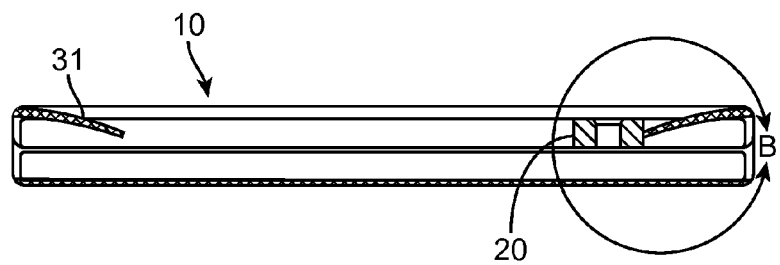
FIG. 3 is a bisected view of a bar.
Figure 4:
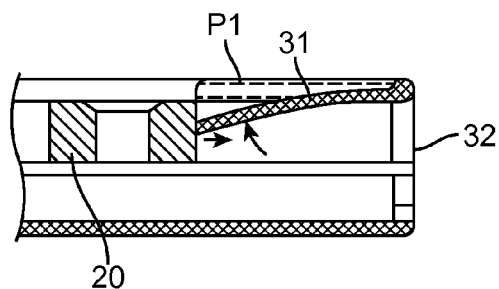
FIG. 4 is an exploded view of portion B in FIG. 5.

FIGS. 2-4 reveals the installation process of end cap 30 and sliding nut 20. There are two methods to installing end cap 30 and sliding nut 20 onto bar 10. One installation process secures sliding nut 20 before end cap 30 is attached to bar 10. The first step in this installation process is inserting sliding nut 20 into channel 11 of bar 10. After sliding nut 20 is secured in channel 11, end cap 30 is inserted and attached to bar 10. Screws 33 are then inserted through holes 34 and aperture 12 and secured onto bar 10.

An alternative installation process attaches end cap 30 before installing sliding nut 20. The first step in this installation process is attaching end cap to bar 10 by aligning holes 34 and aperture 12 and inserting flexible fingers 31 into channels 11. After end cap 30 is attached to bar 10, sliding nut 20 is inserted through slots 32 and pushed past flexible finger 31. As sliding nut 20 engages flexible finger 31, flexible finger 31 is flexed and raised out of the way to position 1 (P1), allowing sliding nut 20 to engage channel 11. Once sliding nut 20 is past flexible finger 31, flexible finger 31 returns to its nominal position which is in a location that would prevent sliding nut 20 from traveling back towards the end of channel 11.

Figure 5:
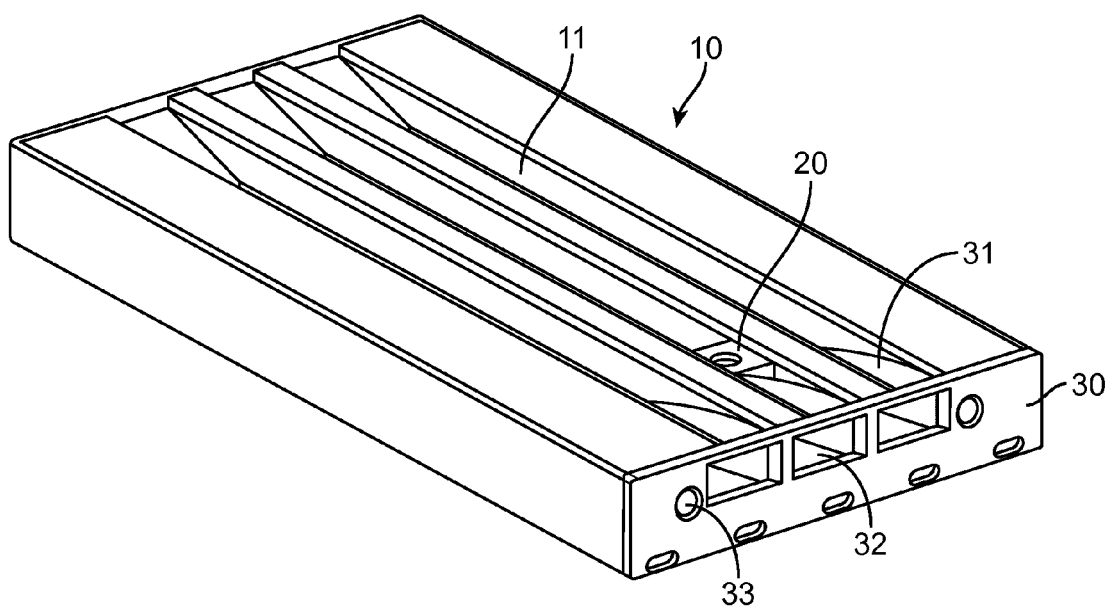
FIG. 5 is an isometric view of an end cap and sliding nut installed on a bar.

FIG. 5 shows an isometric view of bar 10 with end cap 30 and sliding nut 20 properly installed. When operating, end cap 30 constrains sliding nut 20 to a position that is less than the entire length of channel 11 and prevents sliding nut 20 from escaping channel 11 or entering the "no-go-zone." It is advantageous to the strength of any assembly for the position of the nut to be constrained within the channel. When fully assembled, end cap 30 and flexible finger 31 ensures this advantage by containing and limiting the movement of sliding nut 20 within channel 11 without requiring the thoughtful intervention of the installer.

Figure 6:
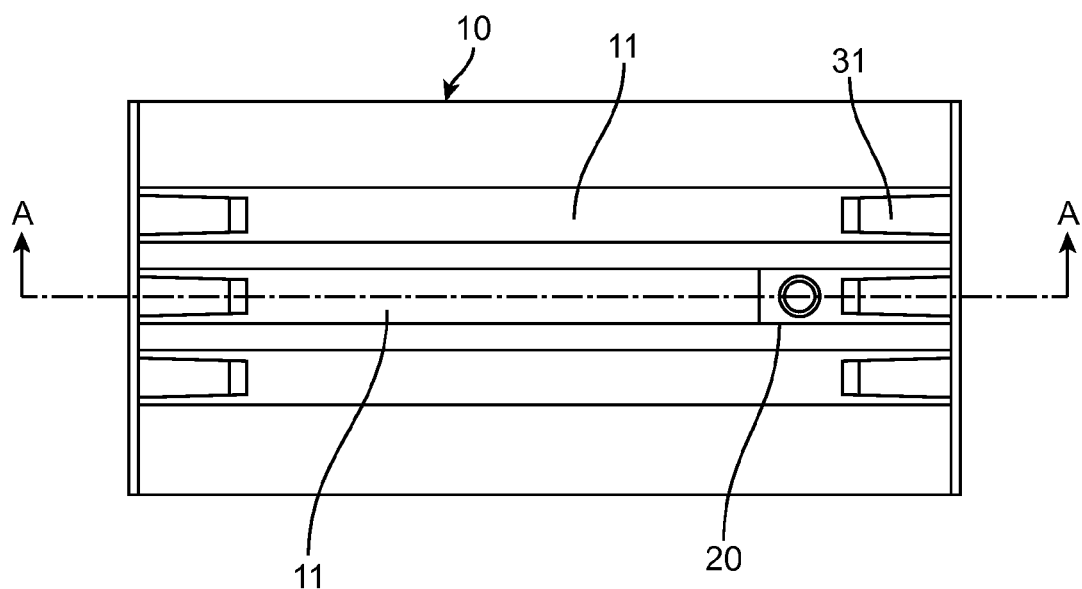
FIG. 6 is a top view of a bar.

Once installed, sliding nut 20 may slide along the length of channel 11 as shown in FIG. 6, linear line A. Sliding nut 20 may be positioned in various locations along the length of channel 11. It is advantageous for sliding nut 20 to be capable of sliding along the length of channel 11 to provide installers the ability to choose a desirable location to mount coupling devices onto bar 10. Often times, installers are restricted or limited to mounting coupling devices on struts like bar 10 because common struts only have predetermined or designated mounting positions. The length of channel 11 provides this advantage by allowing sliding nut 20 to travel within channel 11 while simultaneously preventing sliding nut 20 from entering the "no-go-zone."

Figure 7:
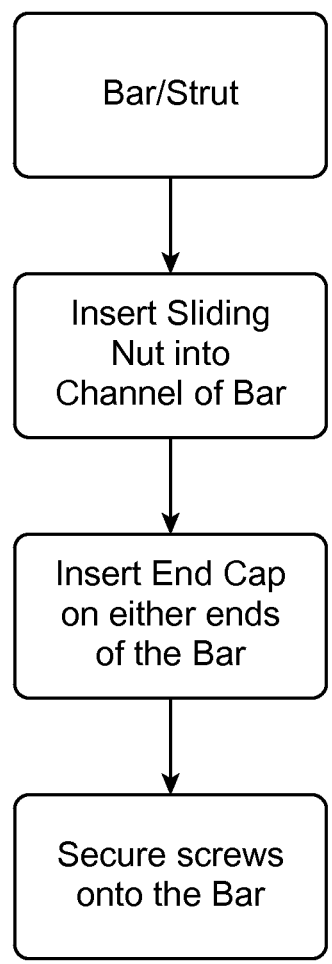
FIG. 7 is a flowchart of a method.
Figure 8:
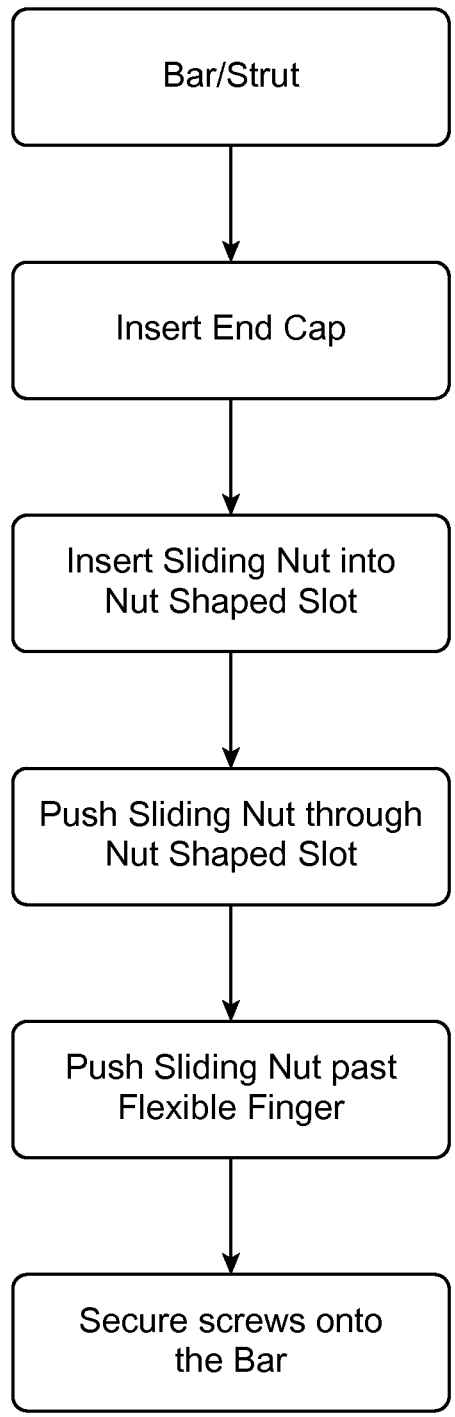
FIG. 8 is an alternative flowchart of a method described in FIG. 7.

FIG. 7 and FIG. 8 reveals two alternative methods for installing end cap 30 and sliding nut 20 onto bar 10. End cap 30 may be attached to bar 10 either before sliding nut 20 is inserted into channel 11 and bar 10. FIG. 7 discloses a method wherein sliding nut 20 is first installed. The first step requires an installer to insert sliding nut 20 into channel 11 of bar 10. The next step requires the installer to attach end cap 30 to either end of bar 10 by inserting flexible fingers into channels 11 and aligning nut shaped slots 32 with channels 11. After attaching end cap 30 onto bar 10, screws 33 are then attached and secured onto bar 10 through holes 34.

FIG. 8 reveals the alternative method wherein sliding nut 20 is installed after end cap 30 is attached and installed. The first step requires an installer to attach end cap 30 to either end of bar 10 by inserting flexible fingers into channels 11 and aligning nut shaped slots 32 with channels 11. The next step requires the installer to insert sliding nut 20 into nut shaped slot 32. After, the installer will push sliding nut 20 through nut shaped slot 32 and engage flexible finger 31. Then sliding nut 20 is pushed past flexible finger 31 and pushed into channel 11. Then screw 33 is attached and secured onto bar 10 through holes 34.

Figure 9:
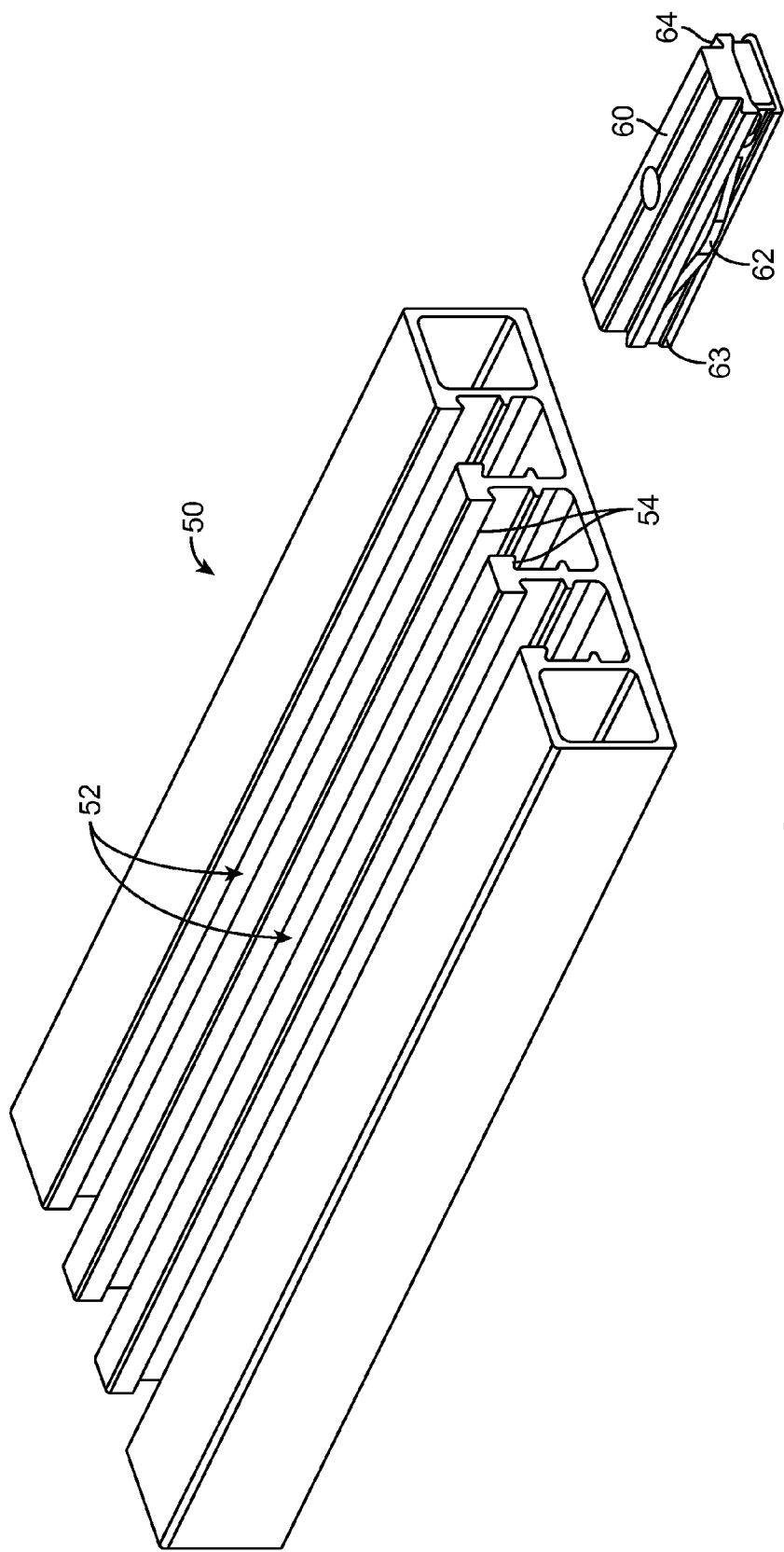
FIG. 9 is an isometric view of a bar with three channels, and a sliding spring nut (with the sliding spring nut removed from the channels to show its structural details).
Figure 10:
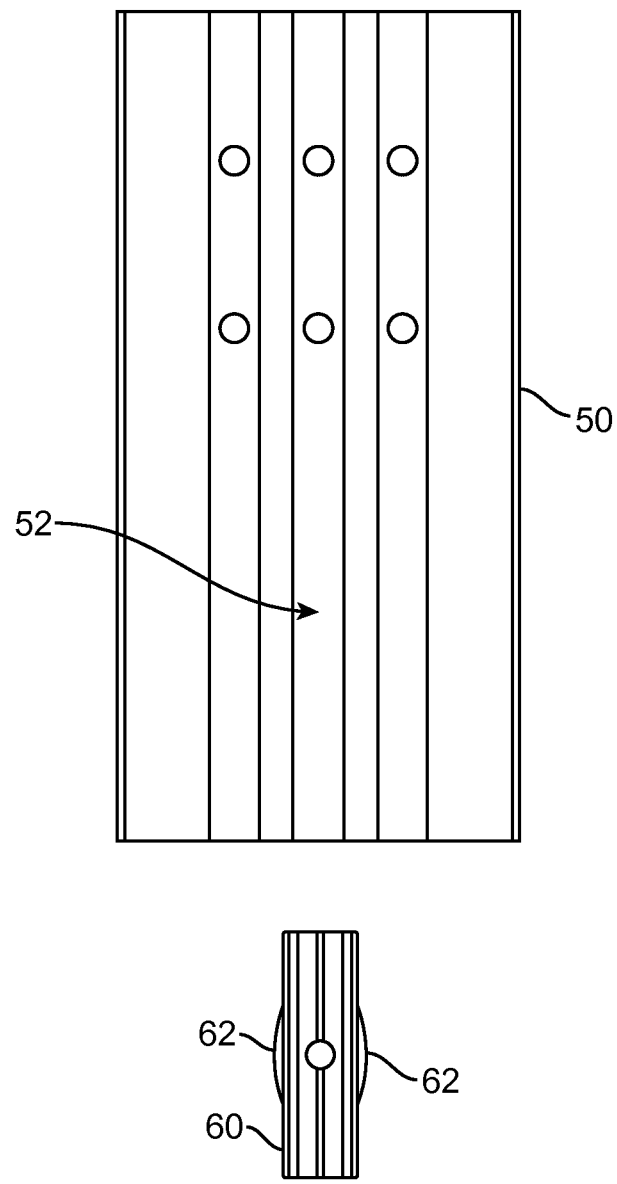
FIG. 10 is a top plan view corresponding to FIG. 9.
Figure 11:
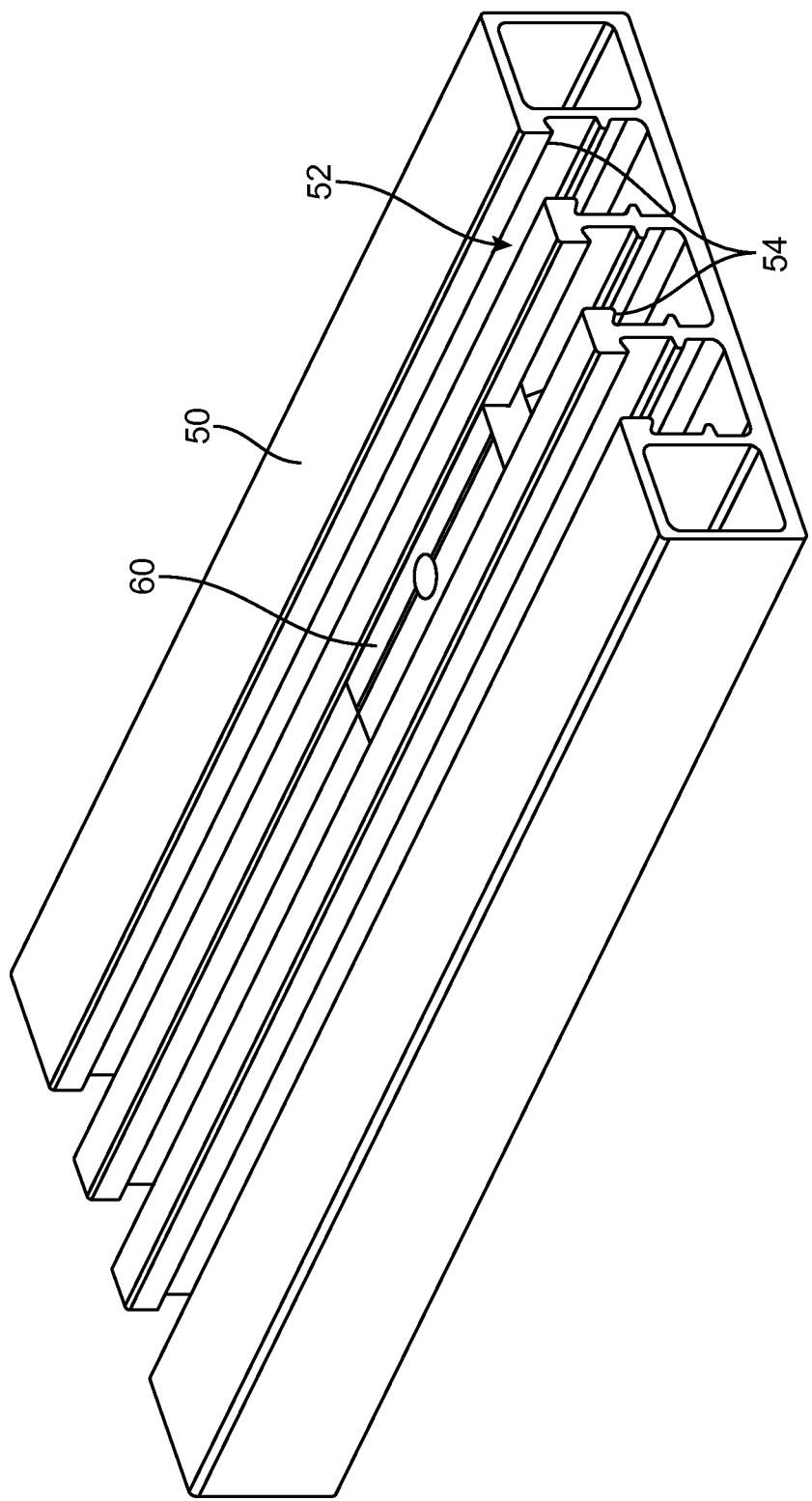
FIG. 11 is an isometric view of a bar with three channels, and a sliding spring nut (with the sliding spring nut inserted into the center channel).
Figure 12:
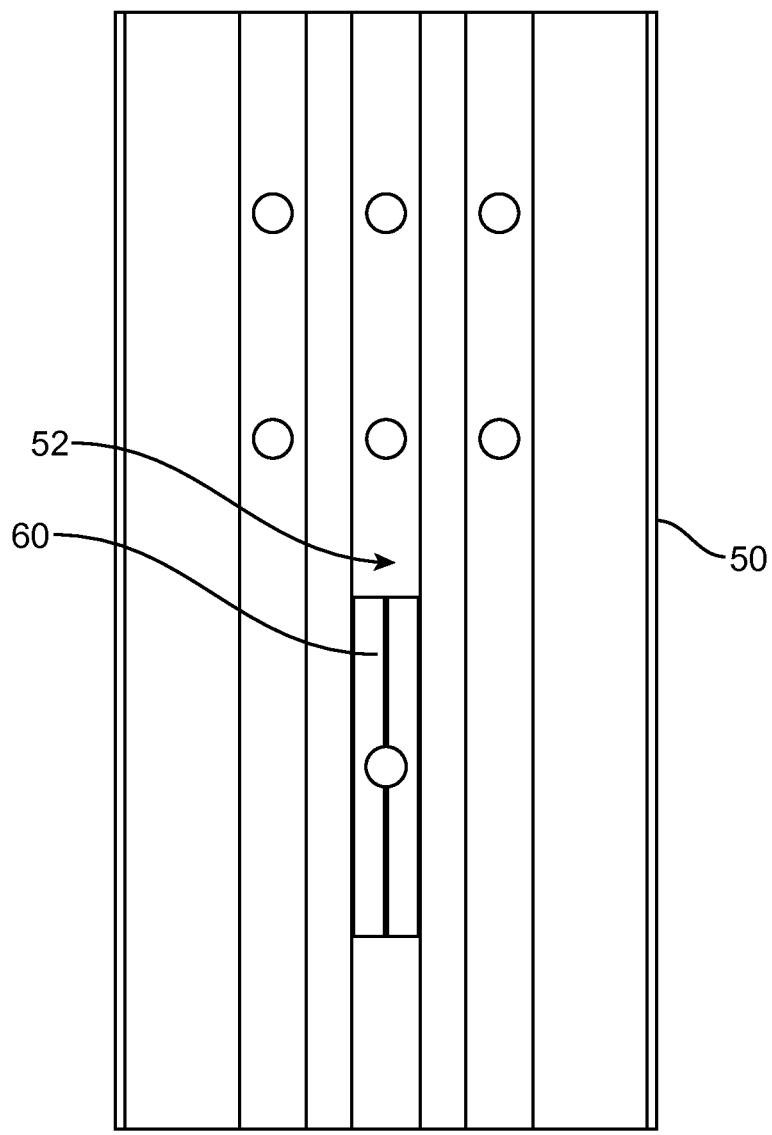
FIG. 12 is a top plan view corresponding to FIG. 11.

FIGS. 9-12 show views of an alternate sliding spring nut embodiment. Bar 50 has three channels 52 running therealong. A spring nut 60 is shaped to slide along within any one of channels 52. Spring nut 60 has an outwardly facing bent spring 62 extending therealong. Spring 62 is compressed slightly when nut 60 is inserted into channel 52. Therefore, spring 62 will provide friction against the sides of channel 52, thereby preventing nut 62 from sliding freely along through channel 52. As can be seen in FIGS. 9 and 11, nut 62 may optionally have upward slanting sides 64 which mate with upwardly angled portions 54 of channel 52. The mating of sides 64 and 54 will prevent nut 60 from being pulled upwardly out of channel 52. In optional embodiments, spring 62 may be made of a single continuous piece of metal extending along inside channels 63 on the side and front of the nut. In its non-biased position, spring 62 is bent laterally outwardly as shown. When the sides of spring 62 are flexed inwardly, the ends of spring 62 simply move back a short distance in channel 63. (FIGS. 9 and 10 show the spring nut removed from channel 52, whereas FIGS. 11 and 12 show the spring nut inserted into channel 52).

Figure 13:
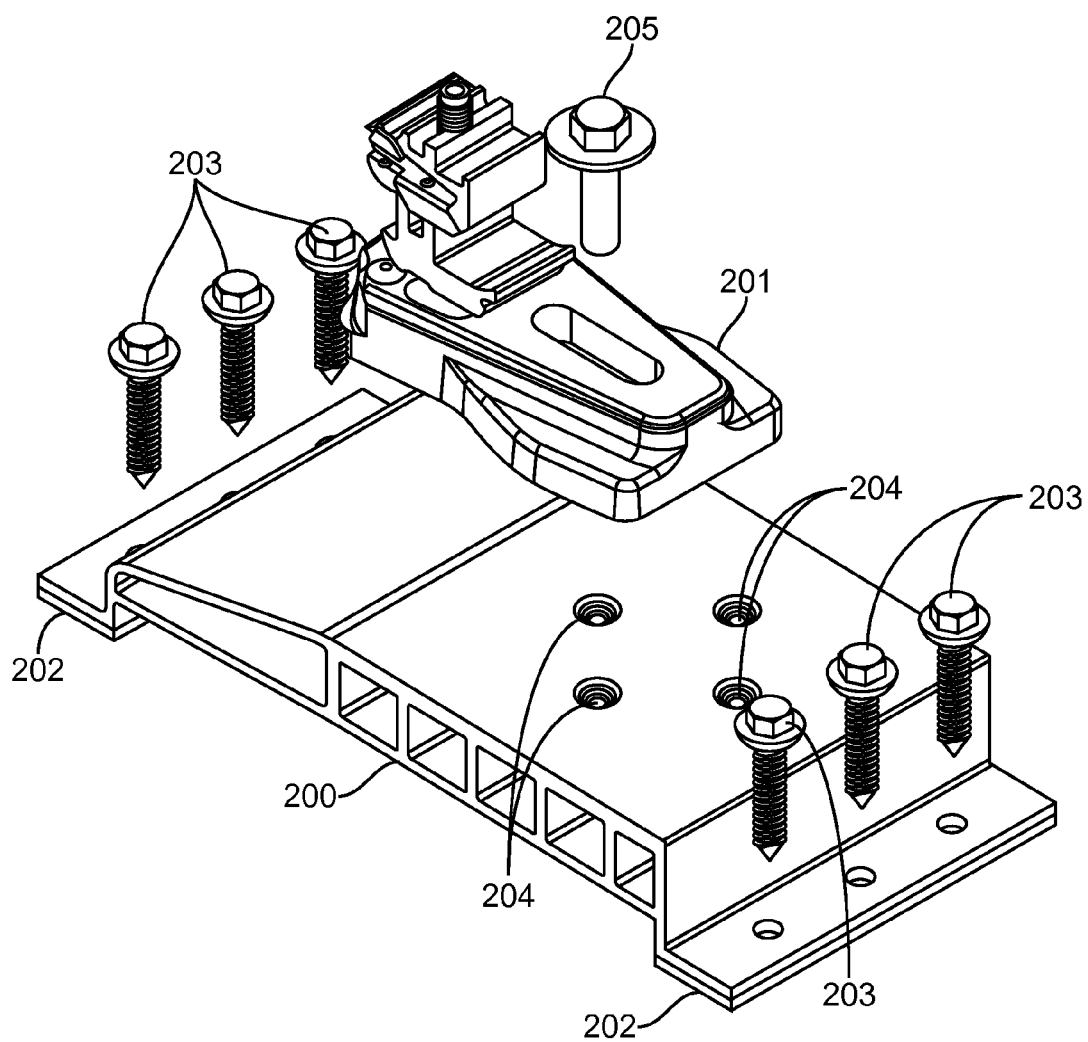
FIG. 13 is an isometric view of a slate mount and leveling foot.

Lastly, FIG. 13 is an oblique exploded view of a PV module roof attachment structure, slate mount 200, and attachment bracket, leveling foot 201. Slate mount 200 is an alternative mounting structure replacing bar 10. Slate mount 200 includes sealing pads 202 affixed to the bottom of slate mount 200. Sealing pads 202 provide a waterproof seal between slate mount 200 and the roof surface (not shown). Slate mount 200 may be attached to roof surface by means of one or more screws, bolts, rivets, or the like, such as screws 203. Slate mount 200 further includes one or more holes, or apertures, such as mounting holes 204, which may or may not be threaded, by which leveling foot 201 may be attached using a bolt, screw, rivet, or the like, such as bolt 205. Holes 204 are provided in a quantity and pattern which allows leveling foot 201 to be attached to slate mount 200 in a location and orientation that is best suited for the given application.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions, and sub-combinations as are within their true spirit and scope.

The invention claimed is:

1. An apparatus for constraining movement of a nut within a channel, comprising:
   (a) a bar having at least one channel extending therealong;
   (b) a nut dimensioned to be received within the at least one channel and to slide along a length of the channel;
   (c) an end cap at one end of the bar, the end cap having an aperture dimensioned to receive the nut therethrough; and
   (d) at least one flexible finger extending downwardly from the end cap down into the at least one channel such that the flexible finger permits the nut to travel thereunder when the nut is inserted into the aperture, but wherein the flexible finger prevents the nut from traveling out of the aperture when the nut is in the channel.

2. The apparatus of claim 1, wherein the flexible finger pushes against a side edge of the nut.

3. The apparatus of claim 1, wherein the at least one channel comprises a plurality of parallel channels extending along the length of the bar.

4. The apparatus of claim 3, wherein the plurality of parallel channels are of the same dimensions.

5. The apparatus of claim 3, wherein the plurality of parallel channels are of different dimensions for receiving different sized nuts therein.

6. The apparatus of claim 1, wherein the at least one channel is open along the top of the bar.

7. An apparatus for constraining movement of a nut within a channel, comprising:
   (a) a bar having at least one channel extending therealong;
   (b) a nut dimensioned to be received within the at least one channel and to slide along a length of the channel; and
   (d) at least one flexible spring extending laterally outwards from the nut to provide resistance to movement of the nut in the channel, wherein the flexible spring is a single continuous piece of metal extending along inside channels on the lateral sides and one longitudinal end of the nut.

8. The apparatus of claim 7, wherein the flexible spring pushes against a side edge of the channel.

9. The apparatus of claim 7, wherein the at least one channel comprises a plurality of parallel channels extending along the length of the bar.

10. The apparatus of claim 7, wherein the at least one channel is open along the top of the bar.

11. The apparatus of claim 7, wherein nut has upward slanting sides from the lateral sides of the nut that mate with upwardly angled portions on the channel in the bar.

12. A method for connecting a plurality of devices to a bar comprising steps:

inserting an end cap comprising one or more flexible fingers and one or more nut shaped slots;
after inserting the end cap, inserting a sliding nut into one of the nut shaped slots of the end cap;
pushing the sliding nut through the nut shaped slot;
pushing the sliding nut past one of the flexible fingers;
securing one or more screws onto the bar; and
thereby enabling the bar to limit travel and constrain linear movement of the sliding nut within the channel of the bar.

* * * * *